Aug. 22, 1939.   L. E. HUMPHRIES   2,170,718
ROD-SUPPORTING BUSHING
Filed Feb. 3, 1938
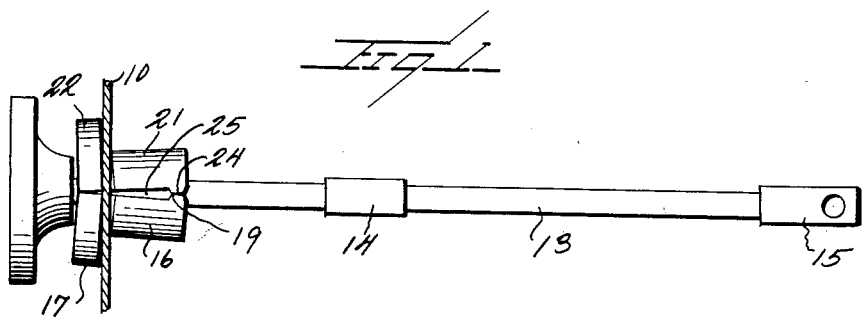
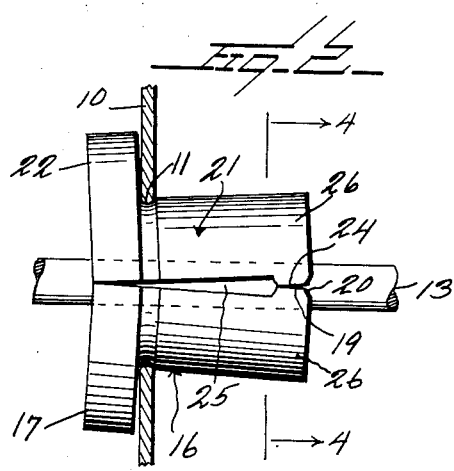
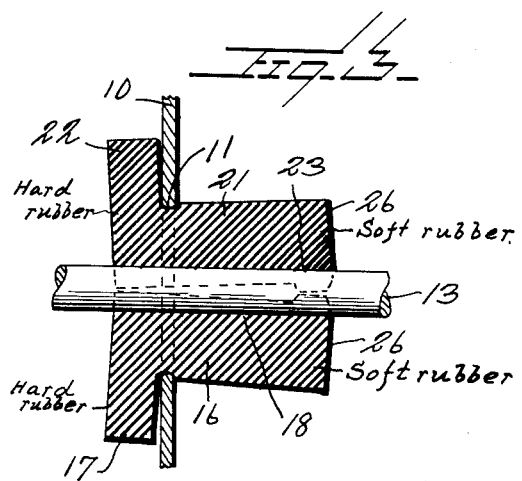
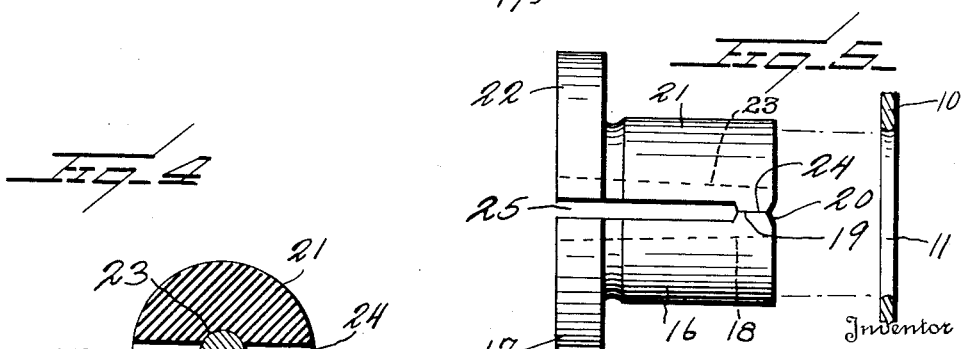
Inventor
L. E. Humphries
By Watson E. Coleman
Attorney Patented Aug. 22, 1939

2,170,718

UNITED STATES PATENT OFFICE 2,170,718

ROD-SUPPORTING BUSHING

Loyal E. Humphries, Balmorhea, Tex.

Application February 3, 1938, Serial No. 188,565

6 Claims. (Cl. 308—26)

This invention relates to the bushings or grommets, as they are sometimes termed, which are used for the bearings of push and pull rods as, for instance, in connection with choke controlling valves or throttle controlling valves or rods of like character in automobiles. Rods as above referred to are ordinarily used in connection with soft rubber grommets or bushings which cut out after a month's use. In the case of certain cars, the entire throttle or choke rod must be replaced along with the bushing so that this renders the repair bill rather high.

The general object of the present invention is to provide a grommet or bushing for this purpose which will lock by expansion when the two halves of the grommet are placed in proper conjunction with each other and within the opening in the dash or instrument board.

A further object is to provide a grommet or bushing formed of two sections, one of which sections may be inserted with the choke or throttle rod in place and the other then inserted through the opening in the dash, this last-named section when inserted and pushed home locking against any movement inward or outward.

Other objects will appear in the course of the following description.

My invention is illustrated in the accompanying drawing, wherein:

Fig. 1 is an elevation of my improved bushing in applied position and showing the push and pull rod passing therethrough.

Fig. 2 is an enlarged elevation of the bushing in applied position, the instrument board being shown in section.

Fig. 3 is a longitudinal sectional view through the bushing and the instrument board.

Fig. 4 is a section on the line 4—4 of Fig. 2.

Fig. 5 is an elevation of the bushing before it is applied, showing its relation to the opening in the instrument board.

Referring to the drawing, 10 designates the dashboard or instrument panel of a motor car. This is formed with the opening 11 through which the throttle rod 13 passes. this throttle rod being formed with non-removable couplings 14 and 15. So far, I have described what is commonly found in motor cars. My improved grommet or bushing is formed of two sections. Each of these sections 16 is approximately semi-cylindrical in form and has a semi-annular flange 17 at one end. Extending longitudinally through the upper face of this section 16 is a semi-cylindrical groove 18. This groove is not parallel to the longitudinal axis of the bushing but is slightly shallower at its rear end than at its forward flanged end (see Fig. 3). The walls defining the groove 18 at their rear ends are formed with the upwardly extending relatively shallow lugs 19, the lugs being rounded at 20 where the lug merges into the rear end face of the bushing.

The upper section 21 of the bushing is likewise semi-cylindrical in general form and formed at its forward end with the flange 22 corresponding to the flange 17 on the section 16. This is also provided with the slightly tapering bore 23 corresponding in taper to the taper of the bore 18 and at its rear end with the lugs 24 formed on each side wall of the groove 23, these lugs being adapted to confront the lugs 19 and being rounded off at their rear ends and merging into the rear end of the bushing.

It will be seen from Fig. 5 that when the two sections 16 and 21 are disposed in parallel relation to each other and with their lugs 19 and 24 engaging, that a longitudinally extending slot 25 will be defined, this slot opening upon the front or flanged face of the bushing.

From Fig. 5, it will be seen that when the two sections of the bushing are disposed in parallel relation to each other that the external diameter of the body of the bushing is slightly greater than the diameter of the opening 11, but if the two sections 17 and 21 are forced towards each other at their forward ends or rocked upon the fulcrums constituted by the lugs 19 and 24 (as shown in Fig. 5), the bushing will have a diameter adjacent the head 17—22 of the bushing slightly less than the diameter of the opening 11. It will likewise be seen from Fig. 5, that the bore formed by the grooves 23 and 18 is rearwardly tapered when the two sections of the bushing are disposed in parallel relation.

When it is desired to put this bushing in place, the lower section 16 of the bushing is disposed within the opening 11 and the push rod 13 disposed in place in the groove of this bushing. Then the upper section 21 is inserted and pushed rearward until the beveled ends of the lugs 24 ride up on the upper faces of the lugs 19. As soon as this occurs, the two sections of the bushing are rocked as upon the fulcrums 19 and 24, so that the forward end of section 16 is canted slightly upward while the forward end of the section 21 is canted slightly downward. This makes the bore formed by the grooves 18 and 23 of uniform diameter throughout the length and just sufficient to embrace the choke rod or throttle rod 13. By rocking the parts to the position shown in Fig. 3, the rear ends of the two sections of the bushing are expanded so that the bushing is wedged tightly in place within the aperture 11. This causes, of course, a slight canting of the flanges 17 and 22 with relation to each other, as shown in Fig. 2. Figs. 2 and 3 show this canting of the two sections and the canting of the flanges in an exaggerated manner so as to fully illustrate my invention but in actual practice, the fact that the flanges do not lie flat against the instrument panel is not noticeable. Even if the throttle or choke rod 13 be not present, still the bushing will engage the dash or instrument board, and as long as the two sections of the bushing are in the position shown in Fig. 3, the bushing will be held locked in place against detachment except by force. If it be desired to detach the bushing, the upper section is pulled forward until the lugs 24 leave the lugs 19, then the bushing collapses and the upper section may be pulled out followed by the lower section. If desired, the two sections may be made with grooves at the junctions of the bodies of these sections with the flanges 17 and 22, so that when the sections are expanded, these grooves will receive the instrument panel or dash. Preferably, though not necessarily, each section will be made of combined soft and hard rubber, thus, for instance, the rearward portion of the section 16 or/and 21 will be of soft rubber as designated by the numeral 26, while the forward end of each section will be formed of hard rubber. The soft rubber portion of the two sections will secure a good frictional engagement with the throttle rod so that the throttle rod may be held by this frictional engagement in any set position.

What is claimed is:

1. A throttle rod bushing formed of two like elongated sections, each section being approximately semi-cylindrical in cross-section and formed with a semi-annular flange at its forward end, each section having a longitudinally extending groove defining a bore when the sections are opposed, the rear ends of the side walls of the groove of each section having longitudinally extending lugs adapted to bear against each other when the sections are opposed and inserted through an instrument board and expand the bushing at its rear end, the rear end of the bushing composed of the two sections when the two sections are extending parallel to each other having a diameter greater than the diameter of the aperture into which said sections are disposed.

2. A bushing of the character described, comprising two complementary sections, each section being semi-cylindrical in cross-section and each section having a longitudinally extending groove on its inner face, said grooves when the sections are placed together in opposed relation constituting a bore having a slight rearward taper, the exterior diameter of the rear ends of the sections, when the sections are disposed in parallel relation, being slightly greater than the aperture through which the sections are to be disposed, the sections being cut away on the confronting faces towards their forward ends whereby the sections may be canted towards each other at their forward ends as and for the purpose described.

3. The combination with an instrument panel having an aperture and a push and pull rod extending through the aperture, of a bushing for the push and pull rod, the bushing being formed in two longitudinal sections, each section being semi-cylindrical in cross-section and having an annular flange at one end, the confronting faces of the two sections being formed each with a longitudinally extending groove, the groove gradually becoming shallower at the rear end of the section, the grooves when the sections are opposed defining a rearwardly tapering bore, the rear end of each section being formed with lugs projecting toward the other section on each side of the groove, the lugs having their rear faces rounded whereby the lugs of one section will ride up on the lugs of the other section when one section is moved longitudinally on the other section through said aperture.

4. A bushing of the character described, formed in two sections, each section being semi-cylindrical in cross-section, each section being formed with a longitudinally extending groove and with a flange at the forward end of the section, the walls of the groove at the rear end of each section being formed with lugs, the lugs constituting fulcrums upon which the sections may rock to expand the sections, the rear ends of the lugs being rounded the forward portion of each section being of hard rubber and the rear portion of the section being formed of soft rubber.

5. A bushing for insertion into an aperture through which a rod extends, comprising two semi-cylindrical bodies forming a completely cylindrical member when disposed in face to face parallel relation having an overall diameter greater than the diameter of said aperture, each of said bodies having at one end a semi-annular flange, a lug formed transversely of each of the confronting faces of the bodies at the other end thereof from the flange, said lugs being designed to bear against one another when the bodies are arranged in confronting relation to form the cylindrical member, and each body having a tapering groove formed in the face confronting the other body from the flanged end to and extending through the lug at the other end thereof, the bodies when disposed in said aperture encircling and having said rod disposed in said grooves, the lugs of the bodies being in abutting relation and the opposite ends of the bodies being canted whereby the tapered grooves form a passage through the member of a diameter to snugly receive the said rod, said bodies being formed of resilient material.

6. A bushing for insertion into an aperture through which a rod extends, comprising two semi-cylindrical bodies forming a completely cylindrical member when disposed in face to face parallel relation having an overall diameter greater than the diameter of said aperture, each of said bodies having at one end a semi-annular flange, a lug formed transversely of each of the confronting faces of the bodies at the other end thereof from the flange, said lugs being designed to bear against one another when the bodies are arranged in confronting relation to form the cylindrical member, and each body having a tapering groove formed in the face confronting the other body from the flanged end to and extending through the lug at the other end thereof, the bodies when disposed in said aperture encircling and having said rod disposed in said grooves, the lugs of the bodies being in abutting relation and the opposite ends of the bodies being canted whereby the tapered grooves form a passage through the member of a diameter to snugly receive the said rod, said bodies being formed of resilient material, each of said bodies having a groove around the curved portion thereof adjacent the flange to receive the edge of the aperture.

LOYAL E. HUMPHRIES.